3,574,210
2,4-DISUBSTITUTED-6-NITRO- AND
6-AMINOQUINAZOLINES
Hermann Breuer, Regensburg, Erich Cohnen, Tegernheim, and Egon Roesch, Regensburg, Germany, assignors to E. R. Squibb & Sons, Inc., New York, N.Y.
No Drawing. Filed July 12, 1968, Ser. No. 744,336
Claims priority, application Germany, July 13, 1967,
P 16 70 445.3
Int. Cl. C07d 51/48
U.S. Cl. 260—251                                      7 Claims

ABSTRACT OF THE DISCLOSURE

This invention relates to certain new 2,4-disubstituted-6-aminoquinazolines and the 2,4 - disubstituted - 6 - nitroquinazolines from which they are produced. The former are useful as anti-inflammatory agents.

SUMMARY OF THE INVENTION

This invention relates to new 2,4-disubstituted-6-nitroquinazolines or 2,4-disubstituted-6-aminoquinazolines of the formula (I)

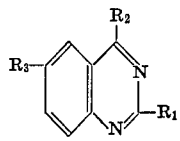

wherein $R_1$ is phenyl or lower alkylphenyl, $R_2$ is lower alkoxy, phenoxy, or di(lower alkyl)amino-lower alkoxy and $R_3$ is nitro, amino, lower alkanoylamino or phenyl(lower alkylidene)amino.

The lower alkyl groups in the various substituents in Formula I include straight or branched chain aliphatic radicals such as methyl, ethyl, propyl, isopropyl, butyl, isobutyl, t-butyl, amyl and the like. The lower alkoxy groups are composed of similar radicals. The lower alkylidene radical of the phenyl(lower alkylidene)amino include divalent aliphatic radicals of the same type. Such groups include, for example, benzylideneamino, phenethylideneamino and the like. The lower alkanoyl radicals which are part of the lower alkanoylamino group include the acyl radicals of the lower fatty acids. Illustrative are acetylamino, propionylamino, butyrylamino and the like.

Preferred compounds of Formula I are those wherein $R_1$ is phenyl, $R_2$ is lower alkoxy, especially methoxy, and $R_3$ is amino.

The new compounds of Formula I, wherein $R_3$ is other than nitro, have anti-inflammatory properties and are useful as anti-inflammatory agents, for example, to reduce local inflammatory conditions such as those of an edematous nature, in various animals such as rats, dogs and the like, when given orally in dosages of about 5 to 50 mg./kg. per day, preferably 5 to 25 mg./kg. per day, in single or 2 to 4 divided doses, as shown by the carageenan edema assay in rats. The compounds may be utilized in compositions containing up to about 300 mg. of a compound of Formula I made up in conventional manner with vehicle or carrier etc., for oral administration to animals as indicated above. Those compounds of Formula I where $R_3$ is nitro are useful in preparing those compounds wherein $R_3$ is amino or substituted amino.

The compounds of Formula I may be produced by reacting a compound of the formula (II)

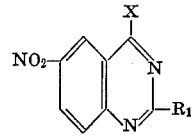

wherein X is a halogen, preferably chlorine, with a compound of the formula $R^2H$, either in the form of its metal salt, e.g., alkali metal salt, or in the presence of an acid binding agent in an inert organic solvent, to produce a compound of Formula I wherein $R_3$ is nitro. The nitro group is then reduced to an amino group by a conventional reduction, e.g., catalytic hydrogenation in the presence of Raney nickel catalyst. This product then reacts with an aldehyde such as benzaldehyde or an acyl halide such as acetyl chloride to obtain, respectively, the product wherein $R_3$ is phenyl(lower alkylidene)amino or lower alkanoylamino.

The following examples are illustrative of the invention.

EXAMPLE 1

18.8 grams of 2-phenyl-4-methoxy-6-nitroquinazoline are suspended in 400 ml. of tetrahydrofuran and hydrogenated in the presence of Raney nickel catalyst. After hydrogen uptake has ceased, the catalyst is separated by filtration and the filtrate is concentrated in vacuo. The residue is crystallized from isopropanol to obtain 13.2 grams of 2-phenyl-4-methoxy-6-aminoquinazoline, M.P. 145–146° C.

The starting material is prepared by suspending 54 grams of 2 - phenyl - 4 - chloro-6-nitroquinazoline (M.P. 206–207° C.) in 400 ml. of tetrahydrofuran and adding dropwise at room temperature 100 ml. of 2 N methanolic sodium methylate solution. The reaction mixture is stirred for one hour at room temperature, filtered under suction, the residue is washed well with tetrahydrofuran and then with water to obtain 47.7 grams of 2-phenyl-4-methoxy-6-nitroquinazoline. The compound melts at 198–200° C. and after recrystallization from methylene glycol melts at 199–201° C.

EXAMPLE 2

7.9 grams (30 mM.) of 2-phenyl-4-ethoxy-6-aminoquinazoline are mixed with 6.4 grams (60 mM.) of benzaldehyde and heated to 50° C. After a short time a clear melt results from which 2-phenyl-4-ethoxy-6-benzylideneaminoquinazoline soon crystallizes. After washing out the excess benzaldehyde with methanol, there are obtained 10.0 grams of the product melting at 158–161° C. After recrystallization from toluene the yield is 7.8 grams melting at 160–163° C.

EXAMPLE 3

2.7 grams (34 mM.) of acetyl chloride are added dropwise at room temperature to 7.4 grams (28 mM.) of 2-phenyl-4-ethoxy-6-aminoquinazoline in 50 ml. of tetrahydrofuran and 50 ml. of pyridine. After 30 minutes the reaction mixture is filtered, the mother liquor is concentrated and the oily residue is treated wtih water. After crystallization from methanol, there is obtained 4.5 grams of 2-phenyl-4-ethoxy-6-acetaminoquinazoline, M.P. 228–230° C.

The following additional compounds are prepared according to the procedure of Example 1.

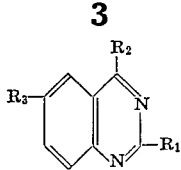

| $R_1$ | $R_2$ | M.P. ($R_3$=$NO_2$) | M.P. ($R_3$=$NH_2$) |
|---|---|---|---|
| —⌬— | —O—CH$_2$—CH$_3$ | 170–173° | 144–147° |
| —⌬— | —O—CH$_2$—CH$_2$—CH$_3$ | 146–148° | 163–165° |
| —⌬— | —O—CH$_2$—CH$_2$—CH$_2$—CH$_3$ | 140–141° | 98–100° |
| —⌬— | —O—C$_6$H$_5$ | 218–221° | 159–161° |
| —⌬—CH$_3$ | —O—CH$_2$—CH$_3$ | 168–170° | 91–93° |
| —⌬— | —O—CH$_2$CH$_2$N(CH$_3$)$_2$ | 128–131° | 92–94° |

What is claimed is:

1. A compound of the formula

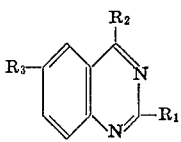

wherein $R_1$ is phenyl or lower alkylphenyl, $R_2$ is lower alkoxy, phenoxy or di(lower alkyl)amino-lower alkoxy and $R_3$ is amino, lower alkanoylamino or phenyl(lower alkylidene)amino.

2. A compound as in claim 1 wherein $R_1$ is phenyl, $R_2$ is lower alkoxy and $R_3$ is amino.

3. A compound as in claim 2 wherein the lower alkoxy group is methoxy.

4. A compound as in claim 2 wherein the lower alkoxy group is ethoxy.

5. A compound as in claim 1 wherein $R_1$ is phenyl, $R_2$ is phenoxy and $R_3$ is amino.

6. A compound of the formula

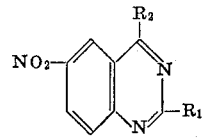

wherein $R_1$ and $R_2$ have the same meaning as in claim 1.

7. A compound as in claim 6 wherein $R_1$ is phenyl, $R_2$ is lower alkoxy and $R_3$ is nitro.

References Cited

UNITED STATES PATENTS 3,466,284  9/1969  Sherlock _____ 260—251

ALEX MAZEL, Primary Examiner

R. J. GALLAGHER, Assistant Examiner

U.S. Cl. X.R.

260—240, 256.4; 424—251